Patented Oct. 18, 1949

2,485,341

UNITED STATES PATENT OFFICE 2,485,341

RUST INHIBITING COMPOSITION

Jones I. Wasson, Union, and James W. Hand, Jr., Summit, N. J., assignors to Standard Oil Development Company, a corporation of Delaware No Drawing. Application October 18, 1947, Serial No. 780,770

4 Claims. (Cl. 252—49.8)

This invention relates to rust preventing oil compositions and more particularly to mineral lubricating oil compositions which tend to inhibit rusting and corrosion of metal parts which are exposed to moisture.

A primary object of the present invention is the preparation of compositions which may be employed as internal combustion engine lubricants and which will also serve for the protection of exposed surfaces of such engines when the same are not in use. When operating engines in climates having high humidity, rusting begins within a very short period of time after the engine is shut down. The compositions of the present invention are particularly valuable in preventing such rusting, and they are valuable not only in the lubrication of internal combustion engines, but for the lubrication of firearms, ordnance equipment, industrial machinery, etc., and in fact for any lubrication purpose where the metal surfaces are exposed to air.

It is known that esters of phosphorous acid exert a stabilizing effect on mineral lubricating oils, but for the purpose of preventing rusting due to moisture it has been found that remarkably good results may be obtained when employing such phosphite esters in combination with partial esters of polyhydric alcohols. The rust preventing characteristics of such a combination of additives is markedly superior to the results obtained when each of the two types of additives is employed separately.

The esters of polyhydric alcohols employed in the composition of the present invention are aliphatic carboxylic acid partial esters of polyhydric alcohols, or more accurately hydroxyl esters. These esters are characterized by having at least one free hydroxyl group in the molecule, and where possible it is preferred to have more than one free hydroxyl group. The preferred esters contain acid radicals derived from aliphatic acids containing at least 10 carbon atoms per molecule, and esters derived from oleic acid, lauric acid, palmitic acid, stearic acid, ricinoleic acid, and the like are particularly useful. Alcohols which may be used as starting materials for producing the esters are exemplified by ethylene glycol, propylene glycol, triethylene glycol, polyethylene glycols, glycerol, erythritol, pentaerythritol, dipentaerythritol, polypentaerythritols, trimethylol propane, arabitol, xylitol, adonitol, sorbitol, sorbitan (partially dehydrated sorbitol), mannitol, and the like. In the case of the dihydric alcohols and the dihydric ether alcohols only one of the hydroxy groups is esterified. With the polyhydric alcohols of three or more hydroxy groups it has been discovered that while the mono esters of the poly-alcohols are very proficient and effective anti-corrosion agents, the esterification of each succeeding hydroxyl diminishes the effectiveness of the partial ester as an anti-corrosion agent until the completely esterified polyhydric alcohol shows little or no anti-corrosion properties.

The partial esters of polyhydric alcohols employed in the present invention are made by reacting one mol of the polyhydric alcohol and one or two moles of a carboxylic acid or carboxylic acid mixture either in the presence or absence of a catalyst. The catalyst may be acidic, e. g., sulfuric or phosphoric acid, or alkaline, e. g., sodium hydroxide, or it may be a salt such as stannous chloride. The ingredients are commingled and heated in a kettle or other container, preferably closed and equipped with suitable agitating means, at a temperature of 125 to 300° C. until the reaction reaches completion. It is frequently desirable to maintain an atmosphere of inert gas such as nitrogen or a carbon oxide over the reacting mass, as by passing an inert gas over or through the reacting mass in order to assist in the removal of the water of the reaction and prevent discoloration of the esters formed, or the reaction may be carried out in a refluxing hydrocarbon solvent with means provided for trapping out the water formed. It is often advantageous to modify the esters by introducing ether groups, for example by reaction with ethylene oxide.

The second compound of the combination additive of the present invention is an ester of phosphorous acid. The organic radical or radicals of such ester may, for example, be alkyl, aryl, aryalkyl, alkaryl or cycloaliphatic in character. Examples of suitable esters include tributyl phosphite, triphenyl phosphite, tri-tert.-amylphenyl phosphite, trilauryl phosphite, and the like. The esters employed are preferably fully esterified acids.

For the purposes of the present invention the partial esters of polyhydric alcohols are added to the lubricating oil base in proportions preferably ranging from 0.05 to 5% by weight while the phosphite esters are added in proportions preferably from 0.05 to 3% by weight. It is to be understood that somewhat larger or smaller proportions than those specified may be employed to give corrosion and inhibiting effects to a certain degree. It is also to be understood that mixtures of two or more compounds from each group may be employed in place of a single compound.

The following example illustrates the application of the present invention to a lubricant suitable for use in an airplane engine, but this example is not to be construed as limiting the scope of the invention in any way.

*Example*

Several blends were prepared using as a lubricating oil base an aviation oil consisting of a solvent extracted paraffin base oil of 120 seconds Saybolt viscosity at 210° F. and viscosity index of 100. To this base oil were added, in the various blends, sorbitan mono-oleate, tributyl phosphate, and combinations of the sorbitan mono-oleate with tributyl phosphite, as shown in the table below. A single cylinder air-cooled engine of 4.5 H. P. at 2000 R. P. M. speed, manufactured by the Wisconsin Motor Corporation, was operated on leaded gasoline and lubricated with the various blends described above and with a sample of the unblended base oil in various tests, in which the cast iron cylinders subsequent to being used in the engine with the oils described were stored in a humidity cabinet operating at a temperature varying between 70° and 90° F. during each 24 hour period and with relative humidity value varying between 50% and 95% during each 24 hour period. After three days of storage in the cabinet under the conditions described the amount of rusting of the cylinder barrel in each case was noted in terms of the percentage of the entire surface which had become rusted. The results are shown as follows:

*Rust test results*

| Oil Blend | Per Cent of Cylinder Barrel Rusted |
|---|---|
| Base Oil | 90 |
| Base Oil+1% sorbitan mono-oleate | 70 |
| Base Oil+0.25% tributyl phosphite | 60 |
| Base Oil+1% sorbitan mono-oleate+0.25% tributyl phosphite | 15 |

The results of the foregoing example show the surprising effectiveness of combinations of the two types of additives as compared with each type of additive when employed separately.

The additives of the present invention may be advantageously employed with mineral lubricating oil bases of a wide variety. These base stocks may be derived from various types of crude petroleums and may consist of distillates or blends of various kinds which have been refined by any of the conventional methods. Synthetic oils may also be used such as those obtained by the polymerization of olefins or by the hydrogenation of coal or its products. The base stock chosen will normally be that oil which without the new additives gives the optimum performance in the service contemplated. The base oils may vary considerably in viscosity and other properties depending upon the particular use for which they are desired. For crankcase use they usually range from about 40 to 120 seconds viscosity Saybolt at 210° F. The viscosity index may range from less than 0 to 100 or even higher.

In addition to the materials to be added according to the present invention, other agents may also be used such as heat thickened fatty oils, sulfurized oils, organo-metallic compounds, metallic or other soaps, sludge dispersers, antioxidants, thickeners, viscosity index improvers, oiliness agents, resins, olefin polymers, and colloidal solids such as graphite or zinc oxide. Solvents and assisting agents such as esters, ketones, alcohols, aldehydes, halogenated and nitrated compounds and the like may also be employed.

The present invention is not to be considered as limited by any of the examples disclosed herein, which are given by way of illustration only, but it is to be limited solely by the terms of the appended claims.

We claim:

1. A composition consisting essentially of a mineral lubricating oil base containing dissolved therein 1% by weight of sorbitan mono-oleate and 0.25% by weight of tributyl phosphite.

2. A composition consisting essentially of a mineral lubricating oil base containing dissolved therein 0.05 to 5% by weight of a member of the class consisting of sorbitan mono-oleate and pentaerythritol mono-oleate, and 0.05 to 3% by weight of a member of the class consisting of tributyl phosphite and tri-p-tert.-butylphenyl phosphite.

3. A composition consisting essentially of a mineral lubricating oil base containing dissolved therein 1% by weight of pentaerythritol mono-oleate and 0.25% by weight of tributyl phosphite.

4. A composition consisting essentially of a mineral lubricating oil base containing dissolved therein 1% by weight of pentaerythritol mono-oleate and 0.25% by weight of tri-p-tert.-butylphenyl phosphite.

JONES I. WASSON.
JAMES W. HAND, Jr.

REFERENCES CITED

The following references are of record in the file of this patent:

UNITED STATES PATENTS

| Number | Name | Date |
|---|---|---|
| 2,084,270 | Shoemaker | June 15, 1937 |
| 2,398,193 | Sharp | Apr. 9, 1946 |